United States Patent [19]
Chabanne

[11] Patent Number: 5,690,386
[45] Date of Patent: Nov. 25, 1997

[54] DEVICE FOR ARTICULATED CONNECTION BETWEEN THE BACKREST AND THE SEAT PART OF A VEHICLE SEAT

[75] Inventor: Jean-Pierre Chabanne, Champvallon, France

[73] Assignee: Irausa Ingeniera S.A., Burgos, Spain

[21] Appl. No.: 667,657

[22] Filed: Jun. 21, 1996

[51] Int. Cl.$^6$ ..................................................... B60N 2/02
[52] U.S. Cl. .................. 297/367; 297/378.12; 297/452.2
[58] Field of Search .................. 297/378.1, 366–369, 297/452.2, 452.18, 378.12, 483, 474, 475

[56] References Cited

U.S. PATENT DOCUMENTS

| | | | |
|---|---|---|---|
| 4,132,447 | 1/1979 | Terada | 297/367 |
| 4,611,853 | 9/1986 | Lehmann et al. | 297/367 X |
| 4,629,252 | 12/1986 | Myers et al. | 297/367 X |
| 5,005,908 | 4/1991 | Young. | |
| 5,138,744 | 8/1992 | Coggon | 297/367 X |
| 5,269,589 | 12/1993 | Brothers et al. | |
| 5,558,403 | 9/1996 | Hammond et al. | 297/367 X |
| 5,564,785 | 10/1996 | Schultz et al. | 297/367 X |

FOREIGN PATENT DOCUMENTS

| | | |
|---|---|---|
| 0359406 | 3/1990 | European Pat. Off. . |
| 0372337 | 6/1990 | European Pat. Off. . |
| 2126476 | 3/1984 | United Kingdom ............ 297/452.18 |

*Primary Examiner*—Milton Nelson, Jr.
*Attorney, Agent, or Firm*—Oliff & Berridge

[57] ABSTRACT

The device relates to vehicle seats in which the backrest armature is composed of two uprights which are articulated with respect to the seat part armature about a first transverse horizontal pin in order to define various positions of comfort and about a second pin, parallel to the first one, in order to allow the backrest to be folded down onto the seat part, the latter articulation being associated with an unlockable immobilizing structure. For each upright, the first articulation with respect to the seat part armature is provided by a lever including, above its part that is journal-mounted on the first articulation pin, a tenon of rectangular section which fits into a central housing formed in the section piece constituting the corresponding upright, whereas in the second articulation, the pin is borne by the aforementioned tenon and interacts with at least one mounting plate which, arranged against the lever, is set tightly into the housing of the section piece to which it is fixed by riveting, this mounting plate having a lower end protruding beyond the upright and locally fitted with toothing designed to interact with complementary toothing borne by a mechanism for immobolizing the upright with respect to the lever.

7 Claims, 5 Drawing Sheets

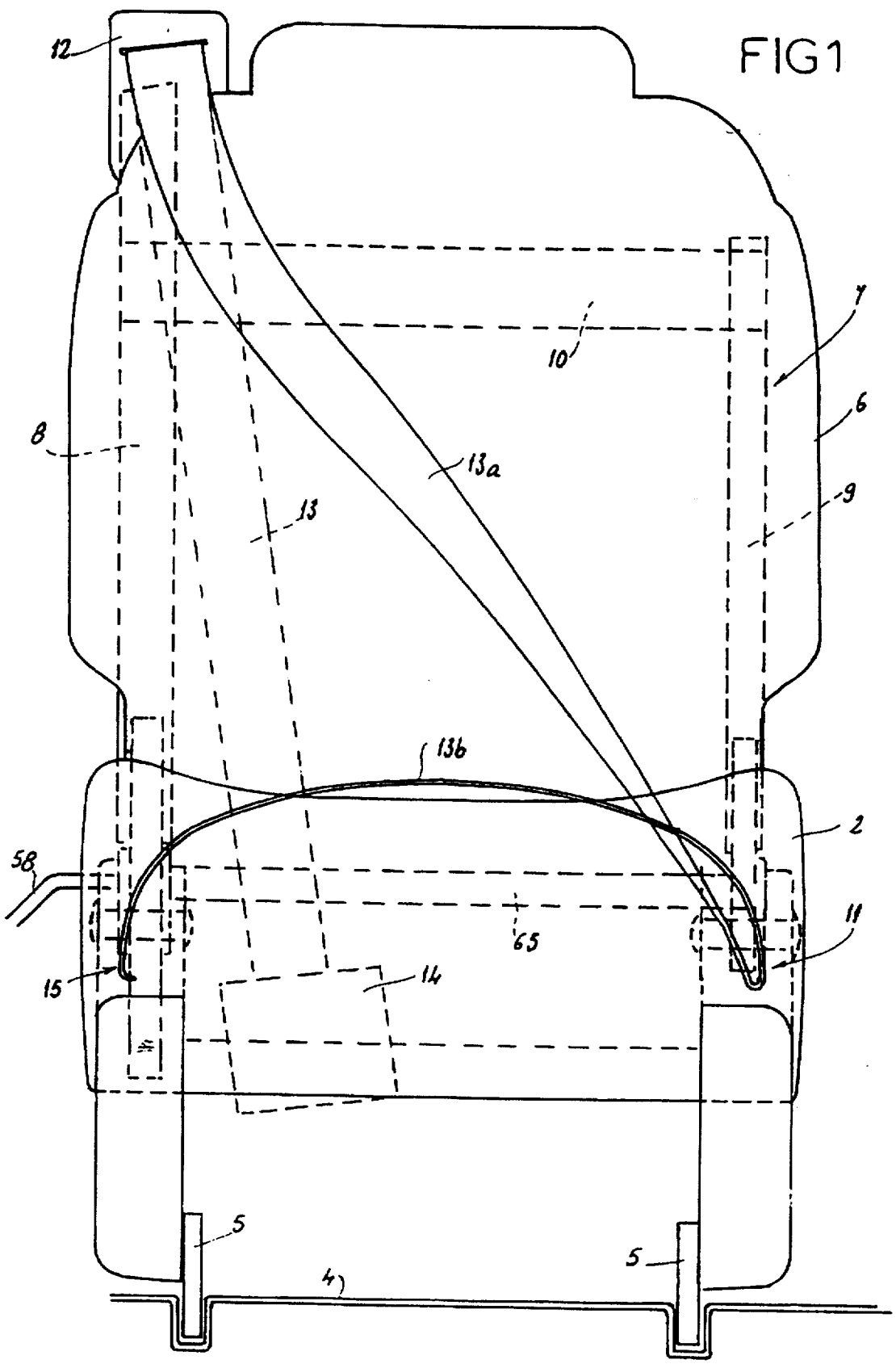

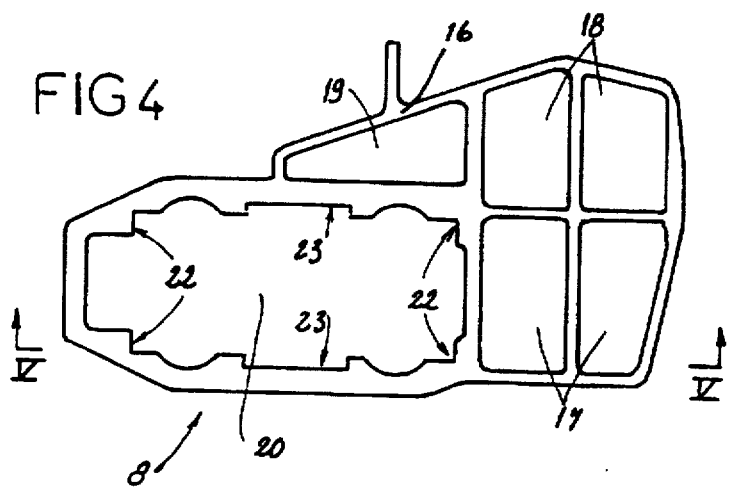
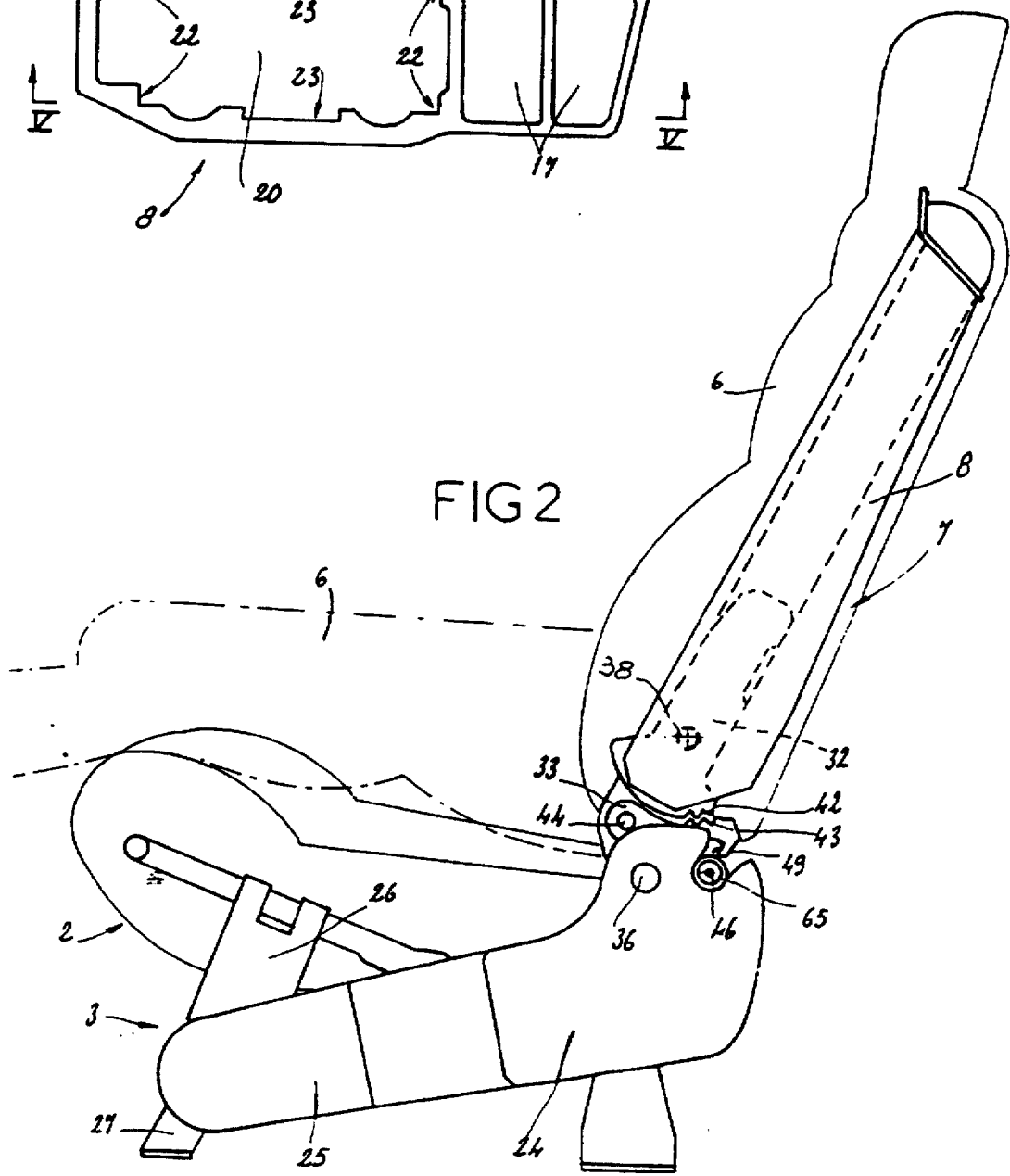

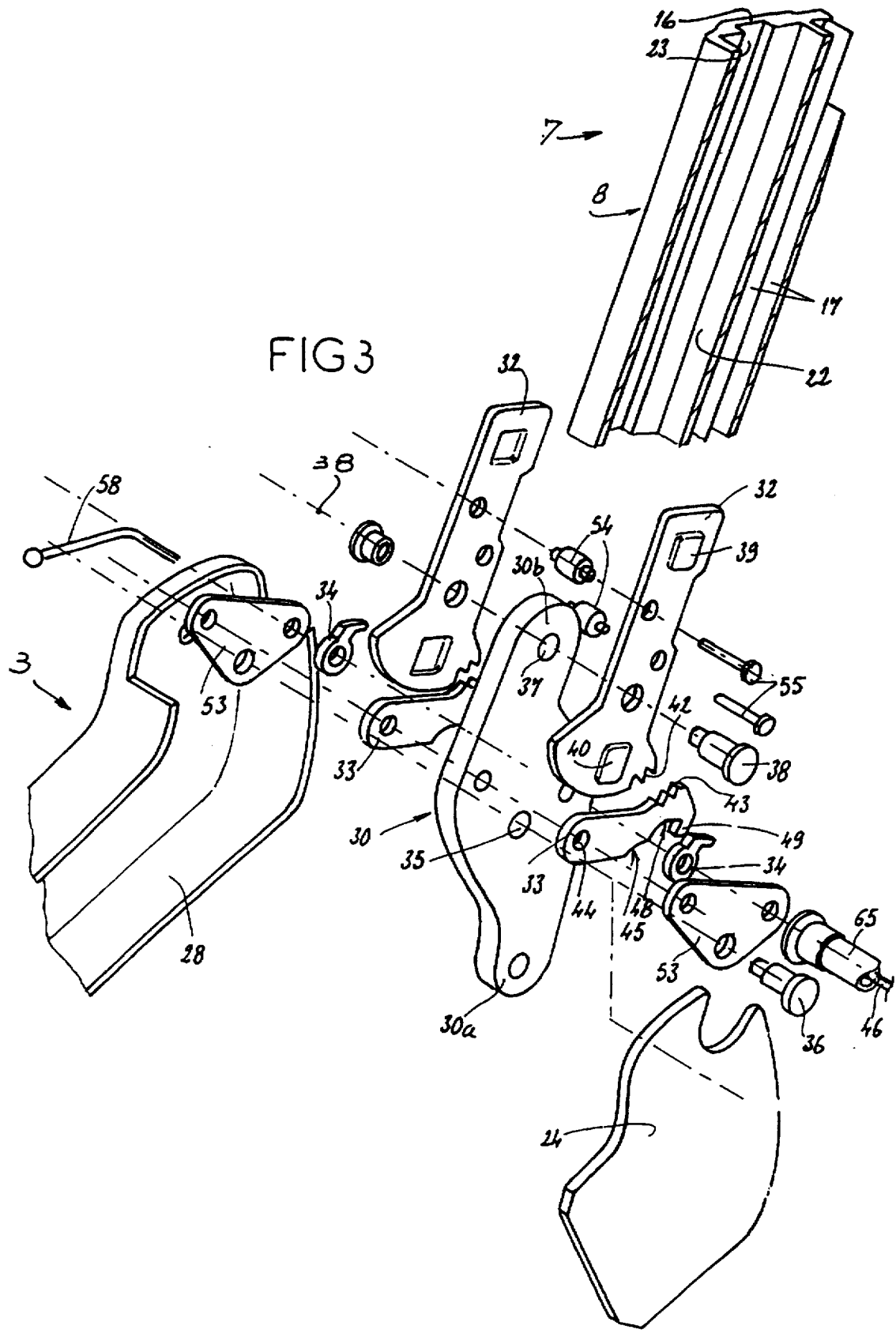

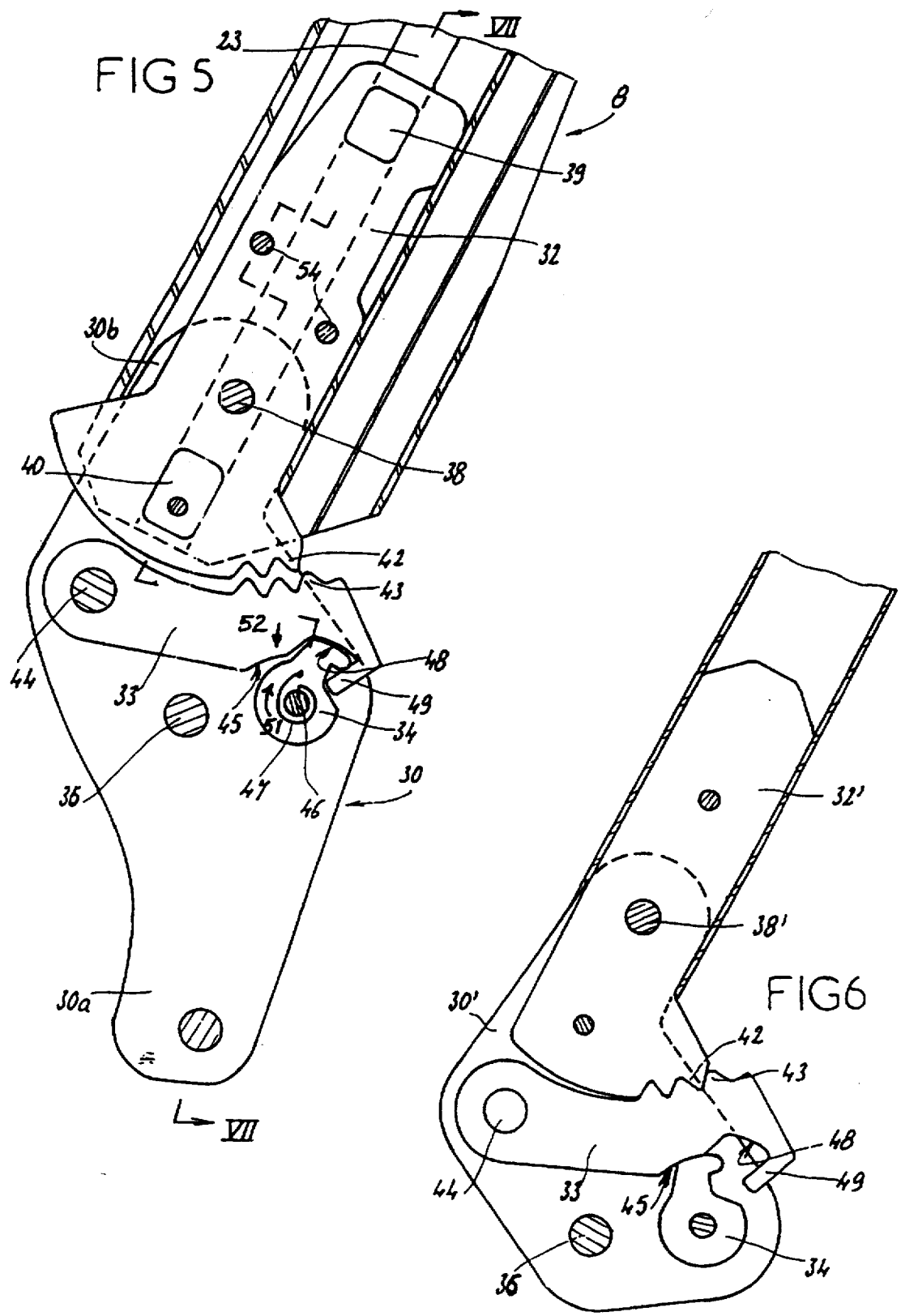

5,690,386

DEVICE FOR ARTICULATED CONNECTION BETWEEN THE BACKREST AND THE SEAT PART OF A VEHICLE SEAT

BACKGROUND OF THE INVENTION

The invention relates to a device for articulated connection between the backrest and the seat part of a vehicle seat.

It relates more particularly to seats in which the backrest armature is mounted with articulation with respect to the seat part armature about a first transverse horizontal pin so that it is able to occupy various positions of comfort and is also articulated about a second pin, parallel to the first one, in order to allow the backrest to be folded down onto the seat part for the purpose of reducing the overall size of the seat.

In this type of seat, the second articulation is normally immobilized by locking means, actuation of which takes place only when the backrest is to be folded down. This type of seat is often employed in public-transport means such as airplanes, trains, motor coaches and some automobiles of the monocoque type. In these various applications, the seat is quite often removable to allow its layout on the floor of the vehicle to be altered on the basis of the degree of comfort required or in order to convert the vehicle for the transportation of goods.

In order to improve the safety of those traveling, it has, for some years now, been envisaged to provide each seat with a seat belt. The diagonal strap of the belt, coming from a winder fixed at the rear of the seat on the seat part structure, passes through a guide ring fixed to the top of one of the uprights of the backrest armature, then drops down to even with the seat part armature where it takes the buckle of a locking tongue fixed into a case fixed on one of the sides of this armature. From the locking tongue, the lap strap runs transversely over the seat, as far as an anchoring component arranged on the other side of the seat part armature.

In the event of an accident, or abrupt deceleration, the kinetic energy imparted to the passenger sitting on the seat is transmitted to the seat belt and, via the latter, to the backrest and seat part armatures respectively. It follows that these armatures have to be strong, both in the regions subject to the highest stresses and in the regions transmitting the forces between the various parts and, for example, in the articulation region for the locking of the backrest with respect to the seat part.

An increase in strength of the two armatures may result from an increase in the thickness of their constituent parts, but this solution has the drawback of increasing the weight of the seat.

DESCRIPTION OF THE PRIOR ART

In order to overcome this drawback, it is therefore preferable to select materials for the various constituent parts on the basis of the local forces and with a leaning toward looking for a reduction in weight, for example using aluminum alloys whenever these can be substituted for ferrous alloys which have a higher specific mass.

This then leads to the use of different materials, which become increasingly more difficult to connect together as the instantaneous forces they have to withstand increase.

SUMMARY OF THE INVENTION

The object of the present invention is to provide a device for connecting between members made of different materials forming part of a double articulation between seat armature and backrest armature, in a seat incorporating a seat belt, the device giving good transmission of forces without affecting either the rigidity of the armatures or the operation of this articulation.

To this end, in the connecting device according to the invention, for each upright, the first articulation with respect to the seat part armature is provided by a lever including, above its part that is journal-mounted on the first articulation pin borne by the seat part armature, a tenon of rectangular section which fits into a central housing formed in the section piece constituting the corresponding upright, whereas in the second articulation, the pin is borne by the afore-mentioned tenon and interacts with at least one mounting plate which, arranged against the lever, is set tightly into a housing of the section piece to which it is fixed by riveting, this mounting plate having a lower end protruding beyond the upright and locally fitted with toothing designed to interact with complementary toothing borne by a mechanism for immobilizing the upright with respect to the lever.

In this structure, the connection between the lever, providing the comfort articulation, and the corresponding upright is provided by means of the mounting plate which is interposed between this lever and the inner face of the upright and which, as a result, is arranged as close as possible to that part of the tubular upright which has greatest strength. This mounting plate is provided with toothings which, interacting with complementary toothings of the immobilizing mechanism, form an assembly which can withstand high instantaneous forces.

When the upright consists of a section piece extruded from aluminum alloy, the articulation of this upright with respect to the lever, made in ferrous alloy, is provided by two mounting plates made in ferrous alloy which are arranged on each side of this lever and are set into longitudinal slots formed inside the section piece, laterally with respect to the housing for the tenon of the lever.

In these conditions, the transmission of forces between the lever and the upright takes place via two mounting plates arranged inside the upright in slots in its wall, that is to say as close as possible to those parts of the upright which best withstand forces.

Advantageously, each of the mounting plates includes, close to its ends, semi-cutouts forming which, projecting away from the lever and having parallel longitudinal edges, are housed in longitudinal slots formed in the section on piece and close to its neutral axis.

The semi-cutouts in each mounting plate essentially have the function of increasing the surface area of contact between each mounting plate and the inner walls of the corresponding upright and of thus improving the transmission of instantaneous forces from the upright to the lever.

Further features and advantages will become clear from the description which follows with reference to the attached diagrammatic drawing representing, by way of nonlimiting example, one embodiment of this articulated-connection device in the case of its application to a removable seat with seat belt, with double articulation of the backrest with respect to the seat part.

BRIEF DESCRIPTION OF THE DRAWINGS

FIG. 1 is a front elevation representing, in simplified fashion, the seat according to the invention.

FIG. 2 is a side elevation of the backrest and seat part armatures,

FIG. 3 is a partial view in exploded perspective showing the various constituent parts of the articulation device according to the invention,

3

FIG. 4 is a front-on view of one embodiment of the section piece constituting at least one of the uprights, FIG. 5 is a side view in part section on V—V of FIG. 4, showing the articulation of the section piece upright.

Figure 7:
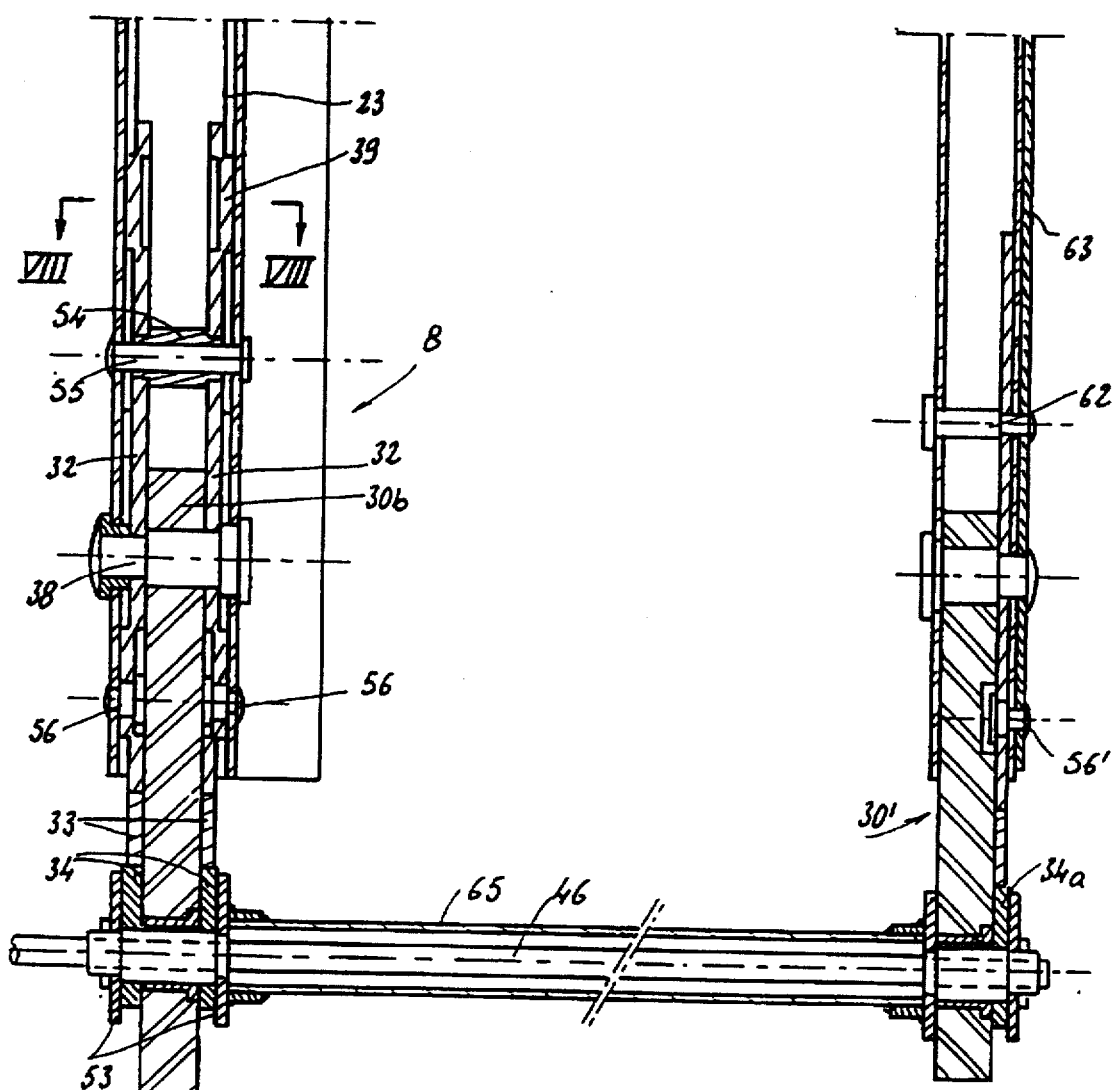
Figure 8:
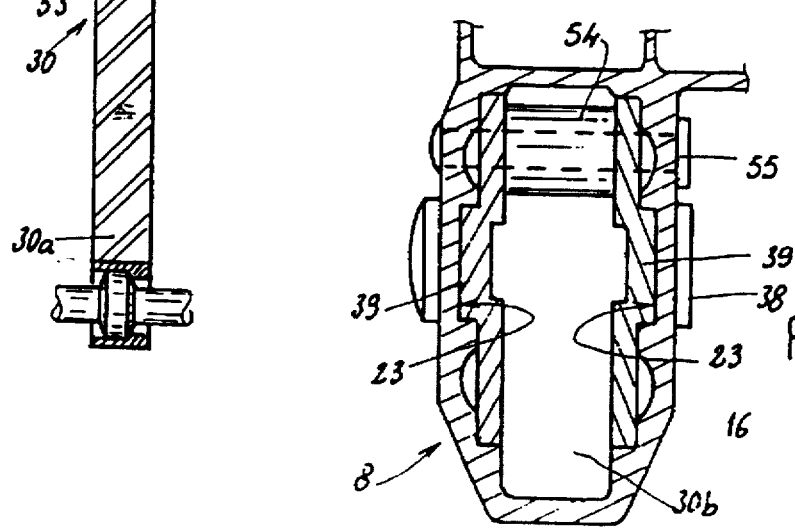

FIG. 6 is a sectional view similar to FIG. 5 but showing the articulation of the other upright of the seat part armature, FIG. 7 is a view in transverse section of the backrest armature in the region of articulation to the seat part armature, FIG. 8 is a section on VIII—VIII of FIG. 7.

DESCRIPTION OF THE PREFERRED EMBODIMENT(S)

The seat, represented in FIGS. 1 and 2, is composed, in the known fashion, of a seat part 2 borne by a seat part armature 3 connected to the floor by an underframe 5 and by a backrest 6 borne by a backrest armature denoted, in general, by 7 and composed of two uprights 8 and 9 joined together by at least one cross-piece 10. One of the uprights, for example the one 8 in FIG. 1, bears at its upper part a guide ring 12 through which the strap 13 of a seat belt, the winder 14 of which is fixed to the seat part armature at the rear of the backrest, passes. The diagonal strap 13a of the belt extends from the guide ring 12 to the buckle of a locking tongue, not represented, fixed at 11 to the seat part armature 3, while the lap strap 13b runs from the afore-mentioned locking tongue as far as a fastening buckle, not represented, fixed at 15 on the other side of the seat part armature 3.

In the embodiment represented, the upright 8 carrying the guide ring 12 for the strap 13 consists of a section piece in aluminum alloy, whereas the upright 9 consists of a conventional tube of rectangular section in ferrous alloy.

As shown in greater detail in FIG. 4, the section piece 8 is composed of a tubular main body 16 which is reinforced, at least locally, by posterior lateral box sections comprising two posterior box sections 17, two box sections 18 juxtaposed with the box sections 17 but protruding laterally beyond the section piece, and a lateral box section 19 attaching the protruding box sections 18 to the corresponding lateral flank of the tubular body 16. This tubular body externally has a rectangular overall shape with a trapezoidal end. Its internal profile is delimited by a rectangular central housing 20 bordered laterally by two slots 22. Emerging from the central part of each of these slots a central slot 23 which runs, like them, longitudinally along the entire length of the section piece.

The seat part armature 2 is composed, on each side, of a main mounting plate 24 and of a secondary mounting plate 25, which are arranged vertically and are intended to withstand most of the forces transmitted to the armature. These mounting plates are used to fix seat part supports 26 (FIG. 2) and underframe members 27. They are fixed to a lateral casing 28 made in aluminum alloy and/or magnesium alloy. This casing is arranged on the outer side of the seat in order to enshroud its mechanism.

As shown in greater detail in FIGS. 3, 5 and 7, the double articulation of the upright 8 of the backrest armature with respect to the seat part armature take place by means of a lever 30, of two mounting plates 32 and of an immobilizing device composed of a catch 33 and of a rotary superlocking pawl 34.

The lever 30, which is made in ferrous alloy, and for example steel, includes a central bore 35 by means of which it is articulated on a pivot 36 constituting the first articulation pin. This pivot passes through the casing 28 and the mounting plate 24. The immobilization of this pivot in terms of translation is provided by riveting the end of its rod against the mounting plate 24.

Towards the bottom of the pin, the lever is provided with an extension 30a which can be coupled to a means for controlling the tilting of the backrest and, for example, to the rod of a gas strut. At its upper end, it is extended by a tenon 30b which fits into the lower end of the central housing of the section piece upright 8.

FIG. 8 shows that this tenon 30b occupies all of the transverse section of this housing.

A bore 37 for a pin 38 used for the articulation of the two mounting plates 32 and constituting the second articulation pin for the backrest passes through the tenon 30b close to its upper end. The two mounting plates 32, made in ferrous alloy, are arranged one on each side of the lever 30 so that they can be set into the lateral slots 22 of the section piece 8 via their upper part and over most of their length. Each mounting plate is provided close to its ends with semi-cutouts 39, 40 respectively, projecting away from the lever and including parallel longitudinal edges. These semi-cutouts engage in the central slots 23 of the section piece.

At their lower parts, protruding beyond the end of the upright 8, the mounting plates 32 are locally, and on their rear parts, equipped with toothings 42 intended to interact with the immobilizing device.

It will be emphasized that these mounting plates are made by precision cutting and that the toothings are heat treated. The same is true of the catches 33 and of the toothings 43 formed at their free end opposite the ends articulated at 44 to the lever 30. Opposite its toothing 43, each catch includes a ramp-shaped profile 45 (FIG. 5) intended to interact with the corresponding rotary locking pawl 34. Each of the pawls is immobilized on a transverse control rod 46 and is connected to return means, such as a spiral spring 47 or a tension spring returning it to the position represented in FIG. 6 which is the position for immobilizing, or superlocking, the toothing of the catch 34 in the toothing 42 of each mounting plate.

The ramp-shaped profile 45 is followed by a recess 48 with a hook 49 making it possible, when the shaft 46 is pivoted so that the pawl 34 rotates in the direction of the arrow 51, to cause the catch 33 to pivot in the direction of the arrow 52 in order to disengage the toothings 43 from those 42 and thus allow the backrest assembly, by pivoting about the pin 38, to come against the seat part 2, as shown in chain line in FIG. 2.

FIG. 3 shows that each catch 33 and superlocking pawl 34 are trapped between the corresponding lateral face of the lever 30 and a reinforcing gusset plate 53 so as to prevent the toothings from disengaging sideways in the event of a violent instantaneous force.

FIG. 8 shows that the mounting plates 32 are provided with spacers 54 favoring their fitting inside the section piece, before engagement of the tenon 30b of the lever 30. When the tenon is put in place, these tubular spacers have rivets 55 passing through them, which rivets pass through the two walls of the section piece 8 and provide a positive connection between the various members, while improving the rigidity of the connection. FIG. 7 shows, moreover, that those parts of the mounting plates lying adjacent to the lever 30 are each fixed to the corresponding wall of the upright 8 by rivets 56.

Thanks to the layout of the mounting plates, on each side of the lever and as close as possible to the neutral axis of the section piece upright, and to the use of lateral toothings which fit perfectly and are treated to exhibit good hardness, forces are transmitted from the upright to the mounting plates very effectively, without the mounting plates being able to damage the upright. That makes it possible to use an upright in aluminum alloy and/or in magnesium alloy, that is to say in a material which has lower hardness than ferrous alloys, but a lower specific mass.

FIG. 7 also shows that the superlocking pawls 34 are immobilized in terms of rotation on the corresponding end of the shaft 46 and that this shaft, mounted so it can rotate freely in the lever 30, is extended on one side by an operating component 58 and runs on the other side as far as the pawl 34a for superlocking the articulated connection of the upright 9 with the seat part armature 3.

This articulated connection is similar to that of the upright 8, but can be differentiated therefrom by the fact that the lever 30' does not have a lower extension 30b and that it is associated with a single mounting plate 32' interposed between the outer face of the lever and the inner face of the wall of the lever turned toward the outside of the seat. The connection between the various members is provided by rivets 60 and 62 which, on the outside, are not folded down directly onto the wall of the upright 9, but against a metal reinforcement 63 pressed against this wall. The mounting plate 32', in its part which protrudes beyond the upright, includes toothings 42 which interact with toothings 43 of a catch 34 identical to the catch of the other upright.

In FIG. 6, the device for immobilizing the backrest armature with respect to the seat part armature in in the locked position with superlocking, whereas in FIG. 5 it is in the unlocked position.

When this device is in a position, this is applied to the two uprights 8 and 9 so that when it is in the locked position, the pivoting of the lever 30 about the first articulation pin 36, this pivoting being transmitted to the lever 30' by the shaft 46 but also by the spacer 65 surrounding this pin, causes the simultaneous tilting of the two uprights and, as a result of this, the tilting of the backrest armature between one or other of the comfort positions.

Because of its structure, this mechanism can be supplied in the form of two pro-assembled assemblies—namely the two mounting plates with the spacers 54, and the lever 30 with the immobilizing mechanism, and this makes fitting easier and reduces the time required therefor, and the cost thereof.

I claim:

1. A device for articulating connection between a backrest and a seat part of a vehicle seat in which a backrest armature comprises two uprights that are articulated with respect to a seat part armature about a first transverse horizontal articulation pin in order to define various positions of comfort and about a second articulation pin, parallel to the first articulation pin, in order to allow the backrest to be folded down onto the seat part, the latter articulation being associated with unlockable immobilizing means, wherein, for each upright, a first articulation with respect to the seat part armature is provided by a lever including, above a lever part that is journal-mounted on the first articulation pin, a tenon of rectangular section that fits into a central housing formed in a section piece constituting the corresponding upright, whereas in a second articulation, the second articulation pin is borne by the aforementioned tenon and interacts with at least one mounting plate which, arranged against the lever, is set tightly into the housing of the section piece and is fixed by riveting, the mounting plate having a lower end protruding beyond the upright and locally fitted with toothing designed to interact with complementary toothing borne by a mechanism for immobilizing the upright with respect to the lever.

2. The device as claimed in claim 1, wherein at least one of the uprights consists of a sectioned piece extruded from aluminum alloy and the articulation of the at least one upright with respect to the lever, made of a ferrous alloy, is provided with two mounting plates made of a ferrous alloy that are arranged on each side of the lever and are set into longitudinal slots formed inside the section piece, laterally with respect to the central housing for the tenon of the lever.

3. The device as claimed in claim 2, wherein each of the two mounting plates includes, close to ends thereof, semi-cutouts forming bosses which, projecting away from the lever and having parallel longitudinal edges, are housed in longitudinal slots formed in the section piece and close to a neutral axis of the lever.

4. The device as claimed in claim 1, wherein the toothing of the immobilizing mechanism interacting with the toothing of the mounting plate is made on an upper part of a catch end articulated at an opposing end to the lever, and a lower part of the toothed catch end includes a ramp capable of interacting with a rotary superlocking pawl.

5. The device as claimed in claim 4, wherein two rotary pawls for superlocking the mechanisms for immobilizing the two uprights are provided and immobilized from rotation on a common shaft that is mounted so that the pawls can rotate freely in the levers forming the first articulation, the common shaft adapted to be extended, on one side of the seat, via control means.

6. The device as claimed in claim 5, wherein the toothings of both the mounting plate and the catch end are precision cut and heat treated.

7. The device as claimed in claim 6, wherein spacer bushes are mounted between the two mounting plates before they are mounted in the section piece the bushes constituting stiffening spacers after the rivets are fitted through the bushes and through the mounting plates and walls of the section piece.

\* \* \* \* \*

UNITED STATES PATENT AND TRADEMARK OFFICE
CERTIFICATE OF CORRECTION

PATENT NO. : 5,690,386
DATED     : November 25, 1997
INVENTOR(S) : Jean-Pierre CHABANNE It is certified that error appears in the above-indentified patent and that said Letters Patent is hereby corrected as shown below:

On the title page, add the following:

--[30]  Foreign Application Priority Data
   June 21, 1995      [FR]  France . . . . . . . . . . . . 95 07746--

Signed and Sealed this

Fourteenth Day of April, 1998

Attest:

BRUCE LEHMAN

Attesting Officer        Commissioner of Patents and Trademarks